United States Patent [19]
Iovine et al.

[11] Patent Number: 5,252,646
[45] Date of Patent: Oct. 12, 1993

[54] POLYLACTIDE CONTAINING HOT MELT ADHESIVE

[75] Inventors: Carmine P. Iovine, Bridgewater, N.J.; Thomas F. Kauffman, Easton, Pa.; Jules E. Schoenberg, Bridgewater; Paul P. Puletti, Pittstown, both of N.J.

[73] Assignee: National Starch and Chemical Investment Holding Corporation, Bridgewater, N.J.

[21] Appl. No.: 968,564

[22] Filed: Oct. 29, 1992

[51] Int. Cl.$^5$ .............................................. C08L 93/04
[52] U.S. Cl. ................................... 524/270; 529/271; 529/272; 529/273; 529/274
[58] Field of Search ............... 524/270, 271, 272, 273, 524/274

[56] References Cited

U.S. PATENT DOCUMENTS

| | | | |
|---|---|---|---|
| 3,537,841 | 9/1970 | Wicker, Jr. et al. | 260/823 |
| 4,511,687 | 4/1985 | Nakanishi et al. | 524/272 |
| 4,804,691 | 2/1989 | English et al. | 523/118 |
| 4,902,615 | 2/1990 | Loomis et al. | 424/486 |
| 4,921,921 | 5/1990 | Ritter | 526/195 |
| 5,169,889 | 12/1992 | Kauffman et al. | 524/270 |

FOREIGN PATENT DOCUMENTS

WO92/19675 11/1992 PCT Int'l Appl. .
WO92/19680 11/1992 PCT Int'l Appl. .
WO92/19690 11/1992 PCT Int'l Appl. .

OTHER PUBLICATIONS

"Ecochem Polymer Venture Slated to Market Lactates", *Chemical Marketing Reporter*, vol. 239, No. 24 Jun. 17, 1991.
"Du Pont/ConAgra Developing Degradable Polymers", *PR Newswire Association, Inc.*, Financial News Section, Jun. 12, 1991,
"Profile Products Target Markets Business Approach Competition", Ecological Chemical Products Company (Ecochem).
Poly Lactic Acid—Pricing list and product range: Henley Chemicals Inc., May 1992.

*Primary Examiner*—Paul R. Michl
*Assistant Examiner*—Peter Szekely
*Attorney, Agent, or Firm*—Ellen T. Dec

[57] ABSTRACT

Hot melt adhesive compositions are prepared from 20 to 98% by weight of a polylactide homo- or copolymer containing at least 20 molar percent of the lactide component; 2 to 80% by weight of a polar tackifier having a Ring and Ball softening point (as described by ASTM E-26) greater than about 60° C.; 0 to 50% by weight of a plasticizer; 0 to 30% by weight of a wax diluent; 0–3% by weight of a stabilizer; and 0–20% of a polymer. By utilizing a naturally occurring, thermoplastic, biodegradable copolymer as the base polymer, these adhesives advance the state of the art of hot melt adhesives by alleviating the dependence on petroleum based materials and by allowing for the development of hot melt adhesives which either degrade naturally after coming in contact with the soil or which can be composted.

20 Claims, No Drawings

POLYLACTIDE CONTAINING HOT MELT ADHESIVE

BACKGROUND OF THE INVENTION

Hot melt adhesives are used commercially for a wide variety of applications. The major advantage of hot melt adhesive systems is the lack of a carrier fluid which eliminates the need for drying the adhesive film once it is applied to the substrate. This elimination of the drying step overcomes hazards associated with solvent usage and also allows for faster production line speeds and lower transportation costs. Depending on the desired use, the degree of tack of the hot melt adhesives may be varied over a wide range to produce adhesives varying from pressure sensitive to non-pressure sensitive in character. Non-pressure sensitive are used, for example, in bookbinding, case and carton sealing, bag ending. Pressure sensitive hot melts are used in many applications, and particularly in disposables such as diapers, sanitary products and the like, where room temperature tack and long open time are required.

Hot melt adhesives have historically been based on petroleum derived polymers such as polyethylene, ethylene-vinyl acetate, styrenic blockcopolymers, and polypropylene to name a few. These compositions are further tackified, plasticized, and reinforced with a variety of resins, oils and waxes which are derived from both petroleum and naturally occurring feedstocks such as wood, gum and tall oil rosin and terpenes. These classic compositions suffer from the cyclical price cycles common to all oil derived materials, and also are generally very resistant to degradation once the articles employing them are disposed of.

The present invention stems from the growing movement away from petroleum raw materials to those derived from renewable, natural resources and as part of an effort to utilize raw materials which have demonstrated some level of degradation. The present invention utilizes a class of naturally occurring or synthetically produced thermoplastic, biodegradable copolymers derived from a non-petroleum feedstock as the base polymer. Such compositions advance the state of the art of hot melt adhesives by alleviating the dependence on petroleum based materials and by allowing for the development of hot melt adhesives which either degrade naturally after coming in contact with the soil or which can be composted.

SUMMARY OF THE INVENTION

It has been discovered that hot melt adhesive compositions suitable for a variety of applications are obtained by use of polylactide (i.e., the bimolecular cyclic ester of lactic acid) or copolymers with other lactones such as glycolide and caprolactone, tackifiers, and optionally, waxes and/or plasticizers. The adhesives may be formulated using conventional additives and may vary from pressure sensitive to non-pressure sensitive in character depending upon the desired application.

In its broadest aspect, the present invention is directed to hot melt adhesive compositions comprising 20 to 98% by weight of a polylactide homo- or copolymer where the copolymer contains at least 20 molar percent of the lactide component (L-, D- and -D, L or meso or mixtures thereof) 2 to 80% by weight of a polar tackifier having a Ring and Ball softening point (as described by ASTM E-26) greater than about 60° C; 0 to 50% by weight of a plasticizer; 0 to 30% by weight of a wax diluent and 0-3% by weight of a stabilizer.

It will be recognized that the general formulations described above can be adapted to include a wide variety of hot melt adhesive compositions, the more precise formulations of which will vary depending upon the specific end use, the knowledge of which is readily available to those skilled in the particular art.

Thus, in general, pressure sensitive adhesives can be prepared using 20 to 70% by weight of the polylactide homo- or copolymer, 10 to 60% of a tackifying resin, 10 to 50% plasticizer and 0 to 3% of a stabilizer. Preferred pressure sensitive adhesives are prepared using 30 to 60% of the polylactide homo- or copolymer; 20 to 50% of a tackifying resin, preferably a terpene phenolic resin; and 20 to 30% of a plasticizer, preferably Pycal 94, a phenyl ether of poly(ethylene glycol) from ICI; or Hercolyn D, a methyl ester of hydrogenated rosin from Hercules. Lower levels of plasticizer may also be employed to produce adhesives useful for various end uses such as in construction adhesives for disposable products where some initial degree of tack is needed but no residual pressure sensitive properties are required.

In general, non-pressure sensitive adhesives can be prepared using 20-98% by weight of the polylactide homo- or copolymer, 2-80% tackifying resin, 0-30% of a wax-like diluent, 0-30% plasticizer and 0 to 3% of a stabilizer. Preferred non-pressure sensitive adhesives are prepared using 30-80% of the polylactide homo- or copolymer; 10-40% tackifying resin, preferably terpene-phenolic resins or rosin derivatives; 0-25% of plasticizer, preferably the phenyl ether of poly(ethylene glycol) or the methyl ester of hydrogenated wood rosin; and 0-20% of a wax-like diluent, preferably hydrogenated castor oil (also known as castor wax) or 12-hydroxystearamide.

Additionally, polymers other than the polylactide may be incorporated into the hot melt adhesives at levels less than about 20% by weight. Representative formulations and applications are discussed hereinbelow and illustrated by the examples, however, these should not be construed as limiting the invention.

DETAILED DESCRIPTION OF THE INVENTION

The major component of the adhesive of the invention, present in an amount of 20 to 98% by weight of the adhesive, comprises a homo- or copolymer of polylactide containing at least 20 molar percent of the lactide comonomer. The general structure of the polylactide is shown below:

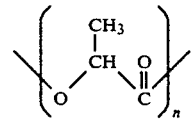

suitable polymers for use herein have a number average molecular weight ($M_n$) within the range of 10,000 to 200,000.

While poly(D,L-lactide) and the meso- are essentially amorphous, poly(L-lactide) or poly(D-lactide) is crystalline in nature and has a crystalline melting point of 186° C. depending on its molecular weight and stereopurity. The polymers may be prepared by ring-opening polymerization of the bimolecular cyclic ester of lactic acid with acid or base catalysts such as PbO, SnCl₂, SnCl₄, ZnCl₂, SbF₅, Sb₂O₃, or triethylamine using solution, precipitation or melt processes. Alternatively, they may b* obtained commercially from Henley Chemicals, Inc. under the Resomere tradename; from Poly sciences Inc. or from Ecological chemical Products Company (Ecochem).

In addition to homopolymers of poly(1-lactide), poly(D,L-lactide), and poly(meso-lactide) suitable polymers for use herein may also be prepared by copolymerization with other lactones such as glycolide or caprolactone. Thus, poly(D,L-lactide-co-glycolide) polymers containing equimolar amounts of the lactide and glycolide components are available from Henley chemicals as Resomer RG502, 503, 504, 505 and 506 and are suitable for use herein. In addition, poly(D,L-lactide-co-glycolide) polymers known as Resomer RG752, 755 and 756 containing 75% of the lactide component as well as the Resomer 858 polymer which contains 85% lactide are also suitable.

The tackifying resins useful in the adhesive compositions are generally polar in nature and have a Ring and Ball softening point greater than 60° C. and include rosin and rosin derivatives, terpene phenolics, pure phenolic resins, and the like. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; (2) glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) phenolic modified terpene resins and hydrogenated derivatives thereof such, for example, as the resin product resulting from the condensation, in an acidic medium, of a bicyclic terpene and a phenol; (4) thermoplastic alkyl phenolic resins such as those described in U.S. Pat. Nos. 4,073,776 and 4,023,826. Mixtures of two or more of the above described tackifying resins, as well as blends of the above resins with small amounts of (e.g., less than about 10% of the adhesive) less compatible resins may be utilized for some formulations. While the tackifier may comprise up to about 80% of the adhesive, it is generally used in amounts of 10 to 60% by weight.

Depending on the end-use application, and particularly for uses requiring pressure sensitive properties, various compatible plasticizing or extending oils may also be present in the composition. Preferred compatible plasticizers include phthalate plasticizers such as dioctyl phthalate; liquid polyesters such as Dynacol 720 from Huls; benzoate plasticizers such as 1,4-cyclohexane dimethanol dibenzoate (e.g., Benzoflex 352 available commercially from Velsicol); phosphate plasticizer such as t-butylphenyl diphenyl phosphate (e.g., Santicizer 154 available commercially from Monsanto); poly(ethylene glycols) and derivatives thereof such as the phenyl ether of poly(ethylene glycol) (e.g., Pycal 94 available commercially from ICI) as well as liquid rosin derivatives having Ring and Ball melting points below about 60° C. such as the methyl ester of hydrogenated rosin (e.g., Hercolyn D from Hercules); as well as vegetable and animal oils such as glyceryl esters of fatty acids and polymerization products thereof.

Other applications conventionally employing adhesives based on these polylactide polymers may require the use of wax diluents in order to reduce the melt viscosity or cohesive characteristics of the hot melt adhesive compositions without appreciably decreasing their adhesive bonding characteristics. These waxes are often used in adhesives which do not exhibit pressure sensitive properties.

Suitable waxes include 12-hydroxystearamide wax, hydrogenated castor oil, oxidized synthetic waxes, poly(ethylene oxide) having a weight average molecular weight above about 1000 and functionalized synthetic waxes such as carbonyl containing Escomer H101 from Exxon.

It should be recognized that some adhesive formulations described herein may contain both wax and plasticizer components so that the presence of one or the other is not mutually exclusive.

Among the applicable stabilizers or antioxidants which may be included herein are high molecular weight hindered phenols and multifunctional phenols such as sulfur and phosphorous-containing phenols. Representative hindered phenols include: 1,3,5-trimethyl-2,4,6-tris(3,5-di-tert-butyl-4-hydroxy-benzyl)benzene; pentaerythritol tetrakis-3-(3,5-di-tert-butyl-4-hydroxyphenyl)propionate; n-octadecyl 3,5-di-tert-butyl-4-hydroxyphenyl) propionate; 4,4'-methylenebis (2,6-di-tert-butylphenol); 4,4'-thiobis (6-tert-butyl-o-cresol); 2,6-di-tert-butylphenol; 6-(4-hydroxyphenoxy)-2,4-bis(n-octylthio)-1,3,5-triazine; di-n-octadecyl-3,5-di-tert-butyl-4-hydroxy-benzylphosphonate; 2-(n-octylthio)-ethyl 3,5-di-tert-butyl-4-hydroxybenzoate; and sorbitol hexa[3-(3,5-di-tert-butyl-4-hydroxyphenyl)propionate]. If used, the stabilizer is present in levels of about 0.1 to 3% by weight.

Optional additives may be incorporated into the hot melt compositions in order to modify certain properties thereof. Among these additives may be included colorants such as titanium dioxide; and fillers such as talc and clay, etc. There may also be present in the adhesive small amounts (e.g., less than about 20% by weight, and preferably 5 to 20% by weight) of certain thermoplastic polymers such as ethylene vinyl acetate containing 12 to 50% vinyl acetate, ethylene acrylic acid, ethylene methyl acrylate and ethylene n-butyl acrylate copolymers as well as caprolactone polymers. These polymers are employed in order to impart flexibility, toughness and strength. Alternatively and in particular, it may be desirable to incorporate into the hot melt adhesive up to 20% by weight of certain hydrophilic polymers such as polyvinyl alcohol, hydroxyethyl cellulose, polyvinyl methyl ether, poly(ethylene oxide), or poly (hydroxy butyrate/hydroxy valerate) which will function to increase the water sensitivity of the adhesives which may be desired for some applications.

These hot melt adhesive compositions may be formulated using techniques known in the art. An exemplary procedure involves placing approximately 40% of the total tackifying resin concentration with all the polymer, wax, plasticizers and stabilizers in a jacketed mixing kettle, preferably in a jacketed heavy duty mixer, which is equipped with rotors and thereupon raising the temperature to a range of from up to about 190° C. After the resin has melted, the temperature is lowered to 150° to 165° C. Mixing and heating are continued until a smooth, homogeneous mass is obtained whereupon the remainder of the tackifying resin is thoroughly and uniformly admixed therewith.

The adhesives disclosed herein may be employed in a wide variety of uses as are known in the art. The adhesives described herein may be effectively utilized in a variety of packaging and carton sealing applications. The non-pressure sensitive adhesives may also be used to bind a plurality of sheets in a wide range of bookbinding operations. They may also be used for laminating tissue and/or screen-reinforced tissue layers such as are used in individual or roll use applications as in wipers, paper towels, toilet tissue and other consumer or industrial end uses. When formulated with plasticizers, the resultant adhesives may be used in the assembly or construction of various disposable applications including, but not limited to, sanitary napkins, disposable diapers, hospital gowns, bed pads and the like. In particular, adhesives are useful for the assembly of disposable articles using multi-line construction techniques wherein at least one flexible film substrate is bonded to at least one tissue, non-woven, polyolefin or other flexible polymeric film substrate. In addition, the adhesives may be useful in the bonding of elastic to polyethylene, polypropylene or non-woven substrate so as, for example, to impart elongation resistant gathers thereto. The adhesive may also be utilized in less demanding disposable construction applications such as for end or perimeter sealing.

In the following illustrative examples all parts are given by weight and all temperatures in degrees Celsius unless otherwise noted.

EXAMPLE I

In preparing the following samples, a heavy duty mixer which had been heated to 190° C. and which was equipped with a stirring paddle was charged with 40% of the tackifying resin and/or diluent. After melting of the resins, stirring was then initiated whereupon the polylactide was added slowly at 190° C. over a one-half hour period after which the temperature was lowered to 170° C. Heating and stirring were continued until a homogeneous mass was obtained whereupon the remainder of the tackifying resin and/or diluent was admixed therewith.

The samples were tested using the following procedures:

Viscosity measurements were determined after 30 minutes using a Brookfield viscometer (Spindle 27) at 350° F.

The adhesive was also subjected to Peel/shear testing such as is conventionally required in the packaging industry. Peel Temperature Test: A bead of test adhesive approximately ⅛ inch in diameter is applied at 325° F. to 350° F. with a glass rod onto 60 pound/ream kraft paper. A second sheet of the same paper is superimposed on the first sheet within 2 seconds and pressed thereto to form a kraft-to-kraft bond. The bonded sheets are then cut perpendicular to the adhesive line into 1 inch wide strips. Duplicate bonded specimens are placed in an oven with one free end of the specimen attached to a fixed support and a 100 gram load suspended from the other sheet at the same end of the bond. The oven temperature is then increased in 10° F. increments at 15 minute intervals. The temperature at which bond delamination occurred is specified as the peel temperature.

Shear Temperature Test: Samples are prepared as in peel temperature test but separate sheets of Kraft at opposite ends of the bonded specimen are suspended and weighted to stress the bond in a shear mode. The temperature of the oven is increased as in peel test until failure occurs.

Adhesion Test: A molten bead of hot melt at 325° F. to 350° F. was drawn across the middle (widthwise) of a 1×3" strip of Kraft paper. A second strip of Kraft paper was then immediately superimposed upon the first and a 50 gram weight placed on top of the construction. The Kraft to Kraft bonds were then aged 24 hours at either room temperature (RT or 70° F.) or at 40° F. After aging, the samples were stressed by hand at the temperature of storage in a 90° peel mode. The presence or absence of fiber tear was then noted.

The compositions and the results of the testing are shown in Table I.

TABLE I

|  | 1 | 2 | 3 | 4 | 5 | 6 | Poly(l-lactide) |
|---|---|---|---|---|---|---|---|
| Poly(l-lactide) | 21.5 | 18.0 | 15.0 | 15.0 | 17.0 | 15.0 | — |
| Hercolyn D | 7.5 | 9.0 | 9.0 | 6.0 | 10.0 | 9.0 | — |
| PEG-200 | 1.0 | 3.0 | — | — | — | — | — |
| Pycal 94 | — | — | 3.0 | 6.0 | 3.0 | 3.0 | — |
| Nirez 300 | — | — | 3.0 | 3.0 | — | — | — |
| 40% VA, EVA | — | — | — | — | — | 3.0 | — |
| Compatibility | Yes | Yes | Yes | Yes | Yes | Yes | — |
| DSC |  |  |  |  |  |  |  |
| Tg | 47° C. | 32° C. | N/T | N/T | N/T | −4° C. | 75° C. |
| Tm | 169° C. | 160° C. | 161° C. | 159° C. | 162° C. | 161° C. | 186° C. |
| Viscosity (cps) @ 350° F. | N/T | 235 | 400 | N/T | 250 | N/T | — |
| Peel (°F.) | N/T | 120 | 80 | N/T | 100 | 120° | — |
| Shear (°F.) | N/T | >200 | >200 | N/T | >200 | >200° | — |
| Adhesion (Kraft) | N/T | F.T. | F.T | N/T | F.T. | F.T. | — |
| RT (40°) | N/T | F.T. | F.T. | N/T | F.T. | F.T. | — |

Hercolyn D - methyl ester of hydrogenated rosin from Hercules
PEG-200-polyethylene glycol from Union Carbide
Pycal 94 -phenyl ether of polyethylene glycol from ICI
Nirez 300 - terpene - phenolic resin from Arizona Chemical
N/T - not tested The test results presented above show the adhesive to be particularly suitable for packing applications such as case and carton sealing due to its low viscosity, good fiber tear and acceptable peel and shear values.

Similar performance results would be expected from the use of comparable amounts of poly(D,L-lactide) or copolymers thereof, however, due to the more amorphous nature of the poly(D,L-lactide) the later polymers would be particularly suitable for hot melt pressure sensitive applications.

Another series of hot melt adhesives were formulated and tested as described above. In this series, the adhesives were also tested for thermal stability by storing at 350° F. for 72 hours and then noting the appearance of the adhesive.

The compositions and test results are shown in Table II.

TABLE II

|  | 7 | 8 | 9 |
|---|---|---|---|
| Poly(l-lactide) | 25.0 | 25.0 | 25.0 |
| Hercolyn | — | 15.0 | 15.0 |
| Pycal 94 | 15.0 | — | — |
| Nirez 300 | 10.0 | — | 10.0 |
| Foral NC | — | 10.0 | — |
| Irganox 1010 | 0.1 | 0.1 | 0.1 |
| Viscosity @ 350° F. | 335 cps | 470 cps | 4125 cps |
| Peel | 100 | >80° F. | 140 |
| Shear | >200 | 150 | >200 |
| Adhesion Rt | F.T. | F.T. | F.T. |
| 40° F. | F.T. | F.T. | F.T. |
| Thermal Stability (72 hours/350° F.) | | | |
| Skin | None | Yes | None |
| Gel | None | None | None |
| Color | Brown | Black | Light Brown |
| Separation | None | Yes | None |
| Char | None | None | None |
| Final Viscosity @ 350° F. | 15 cps | — | 175 cps |

Floral NC is a calcium salt of rosin from Hercules
Irganox 1010 is a hindered phenol antioxidant from Ciba Geigy The results presented in Table II indicate that samples 7 and 9 have acceptable thermal stability for most applications. It is also to be noted that the thermal stability may be even further improved by pre-drying of the polylactide polymer since the polymer picks up moisture when stored as a raw material.

The results also show that sample 9 would be particularly suitable for industrial bag applications where high heat resistance and relatively higher viscosity are required. Sample 7 shows particular use for case and carton sealing. Sample 8, while not having as high a degree of heat resistance, would nonetheless be suitable for less stringent heat resistant applications such as bottle labelling.

We claim:

1. A hot melt adhesive composition comprising 20 to 98% by weight of a polylactide mono- or copolymer containing at least 20 molar percent of the lactide component; 2 to 80% by weight of a polar tackifier having a Ring and Ball softening point, as described by ASTM E-26, greater than about 60° C.; 0 to 50% by weight of a plasticizer; 0 to 30% by weight of a wax diluent and 0–3% by weight of a stabilizer.

2. The adhesive of claim 1 wherein the polylactide is a homopolymer of L- or D,L-lactide.

3. The adhesive of claim 1 wherein the polylactide is a co-polymer of L-lactide or (D,L-lactide) with glycolide or caprolactone.

4. The adhesive of claim 1 wherein the polylactide has a number average molecular weight within the range of 10,000 to 200,000.

5. The adhesive of claim 1 wherein the tackifying resin is selected from the group consisting of (1) natural and modified rosins; (2) glycerol and pentaerythritol esters of natural and modified rosins; (3) phenolic modified terpene resins and hydrogenated derivatives thereof; (4) thermoplastic alkyl phenolic resins; and mixtures thereof.

6. The adhesive of claim 1 wherein the plasticizer is selected from the group consisting of phthalate plasticizers; liquid polyesters; benzoate plasticizers; phosphate plasticizers; poly(ethylene glycols) and derivatives thereof; and liquid rosin derivatives having Ring and Ball melting points below about 60°.

7. The adhesive of claim 1 wherein the wax is selected from the group consisting of hydroxy stearamide wax, hydrogenated castor oil, oxidized synthetic waxes, poly(ethylene oxide) having a weight average including weight above about 1000 and functionalized synthetic waxes.

8. The adhesive of claim 1 wherein there is also present up to 20% by weight of a thermoplastic polymer selected from the group consisting of ethylene vinyl acetate containing 12 to 50% vinyl acetate, ethylene acrylic acid, ethylene methyl acrylate and ethylene n-butyl acrylate copolymers as well as polycaprolactone.

9. The adhesive of claim 1 wherein there is also present up to 20% by weight of a polymer selected from the group consisting of polyvinyl alcohol, hydroxyethyl cellulose, polyvinyl methyl ether, poly(ethylene oxide), or poly(hydroxy butyrate/hydroxy valerate).

10. A hot melt pressure sensitive adhesive composition comprising 20 to 70% by weight of a polylactide homo- or copolymer containing at least 20 molar percent of the lactide component, 10 to 60% of a tackifying resin, 0 to 3% of a stabilizer and 10 to 50% plasticizer.

11. The adhesive of claim 10 comprising 30 to 60% of the polylactide copolymer; 20 to 50% of the tackifying resin, 20 to 30% of the plasticizer and 0 to 3% stabilizer.

12. The adhesive of claim 10 wherein the polylactide polymer is poly(D,L-lactide) or a copolymer thereof.

13. The adhesive of claim 10 wherein the tackifying resin is a terpene phenolic and the plasticizer is a phenyl ether of poly(ethylene glycol).

14. The adhesive of claim 10 wherein there is also present up to 20% by weight of a thermoplastic polymer selected from the group consisting of ethylene vinyl acetate containing 12 to 50% vinyl acetate, ethylene acrylic acid, ethylene methyl acrylate and ethylene n-butyl acrylate copolymers as well as polycaprolactone.

15. The adhesive of claim 10 wherein there is also present up to 20% by weight of a polymer selected from the group consisting of polyvinyl alcohol, hydroxyethyl cellulose, polyvinyl methyl ether, poly(ethylene oxide), or poly(hydroxy butyrate/hydroxy valerate).

16. A non-pressure sensitive adhesive composition comprising 20–98% by weight of a polylactide homo- or copolymer containing at least 20 molar percent lactide, 2–80% tackifying resin, 0–30% of a wax-like diluent, 0–25% plasticizer and 0 to 3% stabilizer.

17. The adhesive of claim 16 wherein the polylactide is poly(L-lactide) or a copolymer thereof.

18. The adhesive of claim 16 wherein the tackifying resin is a terpene-phenolic resin or rosin derivative, the plasticizer is a phenyl ether of poly(ethylene glycol) or the methyl ester of hydrogenated wood rosin and the wax diluent is hydrogenated castor oil.

19. The adhesive of claim 16 wherein there is also present up to 20% by weight of a thermoplastic polymer selected from the group consisting of ethylene vinyl acetate containing 12 to 50% vinyl acetate ethylene acrylic acid, ethylene methyl acrylate and ethylene n-butyl acrylate copolymers as well as polycaprolactone.

20. The adhesive of claim 16 wherein there is also present up to 20% by weight of a polymer selected from the group consisting of polyvinyl alcohol, hydroxyethyl cellulose, polyvinyl methyl ether, poly(ethylene oxide), or poly(hydroxy butyrate/hydroxy valerate).

* * * * *